(No Model.)
E. T. COVELL.
FASTENING FOR HORSESHOES.
No. 483,602. Patented Oct. 4, 1892.
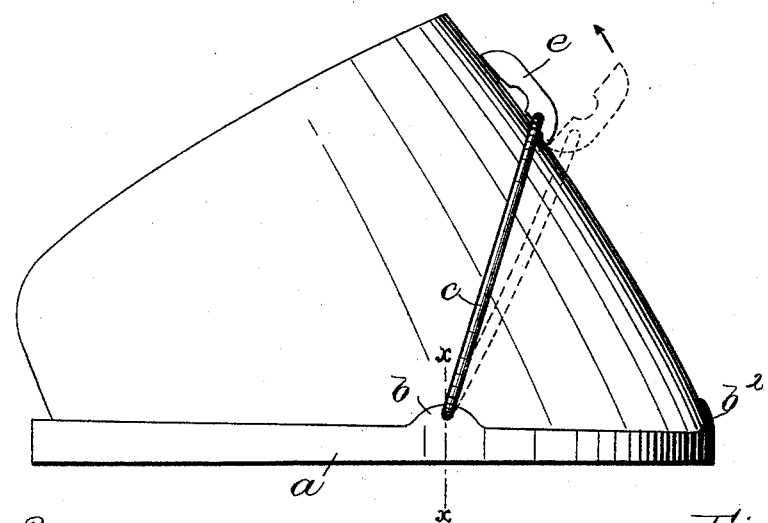
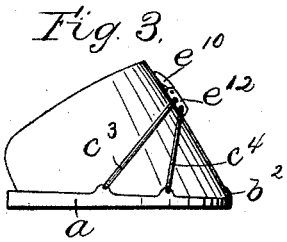
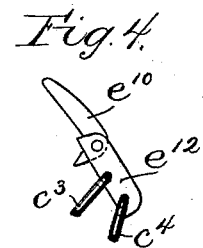
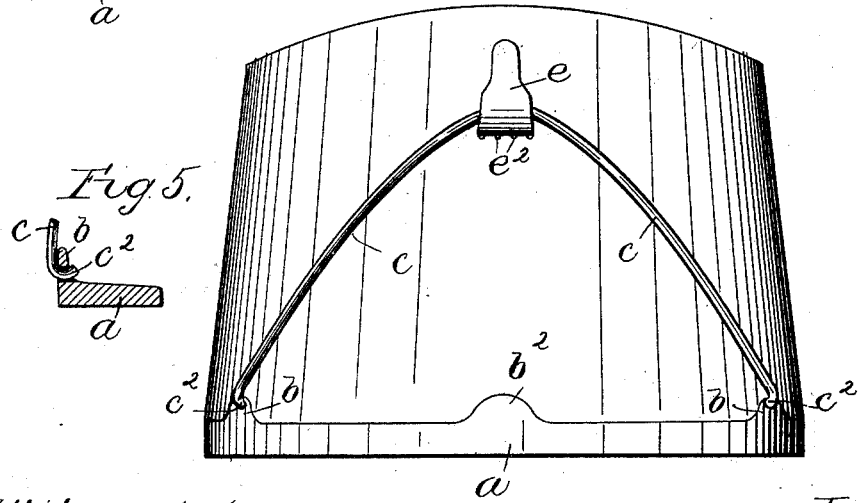
Witnesses
Jas. J. Maloney.
N. E. Hill.
Inventor,
Edward T. Covell,
by Jos. P. Livermore
Att'y

UNITED STATES PATENT OFFICE.

EDWARD T. COVELL, OF NEW BEDFORD, MASSACHUSETTS.

FASTENING FOR HORSESHOES.

SPECIFICATION forming part of Letters Patent No. 483,602, dated October 4, 1892.

Application filed December 15, 1891. Serial No. 415,089. (No model.)

*To all whom it may concern:*

Be it known that I, EDWARD T. COVELL, of New Bedford, county of Bristol, State of Massachusetts, have invented an Improvement in Fastenings for Horseshoes, of which the following description, in connection with the accompanying drawings, is a specification, like letters on the drawings representing like parts.

My invention relates to a fastening for horseshoes by which the shoe may be securely fastened to the hoof without the employment of nails or other fastenings that penetrate the shell of the hoof.

The invention consists, essentially, in a shoe provided with lugs or projections that engage the lower edge of the hoof, so as to prevent the sliding of the shoe along the base of the hoof, said projections or lugs being shown in this instance as substantially the same as those heretofore used in shoes intended to be fastened to the hoof by nails. In conjunction with the shoe provided with such lugs a fastening band or bail is employed, which engages with the shoe at the sides of the hoof, and preferably in perforations in the said lugs, said bail passing substantially vertically over the front inclined portion of the hoof and being connected with a straining device that engages with the outer front face of the hoof some height above the shoe. In its simplest form the said fastening band or bail is composed of a piece of stout wire bent or offset at its ends to pass through the perforations in the lugs at the sides of the shoe, and the straining device is a lever provided with a spur end that engages securely with the shell of the hoof, so as to form a fulcrum on which the lever turns in straining the fastening-band and also to support and secure the fastening-band when strained. The said fastening-band thus pulls the shoe in a substantially-vertical direction against the under face of the hoof, and in connection with the lugs, which prevent the shoe from sliding along the hoof, affords a secure fastening, which may, however, be easily released or unfastened when required, thus enabling the shoes to be changed with very little trouble.

Figure 1 is a side elevation of a hoof provided with a shoe and fastening therefor embodying this invention. Fig. 2 is a front elevation thereof. Fig. 3 is a side elevation illustrating a modification. Fig. 4 shows an enlarged detail of the straining device shown in Fig. 3; and Fig. 5 shows a sectional detail on line $x\text{-}x$, Fig. 1.

The shoe $a$ may be of usual construction, except that it need have no nail-holes, the said shoe being provided with lugs $b$ $b^2$, that engage with recesses in the edge of the hoof, so as to properly position the shoe relative to the hoof and prevent it from sliding thereon, said lugs being preferably the same as heretofore commonly used on horseshoes and being burned into the hoof in fitting the shoe thereto in the usual manner, in order to securely fasten the said shoe to the hoof.

The shoe is, in accordance with the present invention, engaged with a band or bail $c$, which may be a piece of stout wire of proper length to pass in arch shape over the fore part of the hoof, as shown, the said bail being preferably offset or provided with fingers $c^2$ (see Fig. 5) at its ends, which pass into suitable perforations made in the side lugs $b$, as clearly shown. In order to effectually fasten the shoe, said band $c$ must be strained tightly over the fore part of the hoof and securely fastened from sliding down thereon, which effect may be produced by means of a straining device (shown as a lever $e$) provided with suitable spurs or prongs $e^2$ (see Fig. 2) to engage securely with the shell of the hoof, the bail $c$ being engaged with said lever preferably by passing through a transverse perforation thereof at a short distance from the spurred end, as shown. Thus by applying the spurred end of the lever to the hoof, as shown in dotted lines, Fig. 1, the said end becomes a fulcrum about which the lever may be turned from the dotted to the full line position, thus straining the band $c$, as will be readily understood, while at the same time the increasing strain of said band tends to embed the spurs into the shell of the hoof sufficiently tight to prevent the lever from slipping along the hoof after it is turned to the full-line position, Fig. 1, thus securely fastening the band to the hoof, so that it draws and holds the shoe firmly against the hoof. The strain of the band $c$ tends to retain the lever $e$ in full-line position, and also tends to press the spurred end of the lever more firmly in contact with the hoof, so that there is no danger of its slipping down along the hoof and thus loosening the fastening-band.

If desired, more than one band may be employed, as shown in Fig. 3, in which there are two bands $c^3$ $c^4$ engaged with the shoe at different points along the side thereof. In this construction the straining-lever $e^{10}$ does not engage directly with said bands, but is pivotally connected with a band-receiving piece $e^{12}$, so that the said lever fulcruming on the hoof draws the said band-piece upward along the fore part of the hoof, thereby tightening the band. It usually will not be necessary, however, to employ two fastening-bands, as a single band arranged as shown in Figs. 1 and 2 affords a secure fastening, and is at the same time simpler in construction and of better appearance than the modified construction, in which more than one band is used.

This fastening has the advantage that it may be applied in connection with shoes of the kind already in use, requiring no change whatever in the shoe, except the perforations of the side lugs to enable them to be engaged with the fastening-band, and such perforations may be readily made by a punch when the shoe is hot, thus enabling the fastening to be applied by a blacksmith without requiring any special tools.

I claim—

1. The combination, with a horseshoe provided with lugs or projections to engage with the edge of the hoof, of the fastening-band connected at its ends with the sides of the shoe and adapted to extend up over the fore part of the hoof and the straining device therefor provided with a projection to engage with the fore part of the hoof, substantially as and for the purpose described.

2. The combination, with the shoe, of a fastening-band connected with the sides of said shoe and constructed to extend over the fore part of the hoof and a straining-lever engaged with said band and provided with spurs to engage with the hoof, substantially as and for the purpose described.

In testimony whereof I have signed my name to this specification in the presence of two subscribing witnesses.

EDWARD T. COVELL.

Witnesses:
 DANL. S. DEVOLL,
 WM. A. ALMEZ.